3,629,369
PROCESS FOR THE PREPARATION OF MODIFIED POLYVINYL CHLORIDE WITH HIGH IMPACT RESISTANCE
Philippe Lalet, Orthez, and Andre Miletto, Pau, France, assignors to Société Anonyme dite: Société Nationale des Petroles d'Aquitane, Courbevoie, France
No Drawing. Filed Dec. 30, 1969, Ser. No. 889,296
Claims priority, application France, Dec. 30, 1968, 181,996
Int. Cl. C08f 15/00, 19/00
U.S. Cl. 260—879                              4 Claims

ABSTRACT OF THE DISCLOSURE

Polyvinyl chloride having high impact resistance is disclosed. This polyvinyl chloride is prepared by polymerizing an aqueous suspension of vinyl chloride in the presence of halogenated butyl rubber.

---

The present invention relates to the preparation of improved vinyl chloride polymers which are modified by halogenated butyl rubber.

It is known that the polyvinyl chloride products which are presently manufactured are objectionable since they are characterized by little toughness. This is the reason why it is necessary to find polymers of vinyl chloride with an improved impact resistance, which conserve the good mechanical properties of the polyvinyl chloride.

In order to improve the properties of polyvinyl chloride, it has been found advantageous to mix it with appropriate elastomers, such as acrylonitrile-butadiene or butadiene-styrene copolymers or grafted copolymers of acrylonitrile and styrene on polybutadiene. However, the homogenisation of these mixtures raises difficult problems and the shock resistance of such products is usually low.

It has also been proposed to prepare graft copolymers of vinyl chloride by polymerising vinyl chloride in aqueous suspension in the presence of polybutadiene or polyisopropene, but the use of very unsaturated trunk polymers causes numerous crosslinkings, which have made the homogenisation more difficult and lead to ageing effects.

The use of saturated elastomers, such as the ethylene-propylene copolymers, as trunk polymers has thus been considered, but the means necessary for initiating the grafting have to be fairly energetic and usually cause undesirable degradation reactions in the polymer.

French Pat. 1,385,548 has claimed the production of polymers with high and lasting impact resistance by mass polymerisation of vinyl chloride in the presence of chlorinated butyl rubber. The graft polymers which are obtained do not contain any crosslinking, have good resistance to ageing and show a good impact resistance, which increases with the degree of grafting. However, it is known that the mass or bulk polymerisation of vinyl chloride presents problems which are difficult to resolve, particularly as regards the control of the degree of polymerisation and the elimination of heat during the polymerisation.

French Pat. 1,385,548 also discloses that the "reactions in emulsion or in suspension do not lead to a grafting, but to a simple mixing of the polyvinyl chloride and the chlorinated butyl rubber, which mixture has an impact resistance higher than that of polyvinyl chloride, but clearly lower than those of the graft polymers, for an equal quantity of chlorinated butyl rubber."

Tests have been carried out in practice which have shown that, by effecting suspension polymerisation in the conventional manner, that is to say, by introducing the vinyl chloride into an aqueous dispersion of chlorinated butyl rubber, there are obtained polymers having a heterogeneous appearance and also characterized by numerous crusts. These products show an unsatisfactory behavior when they are calendered, because they are friable. In addition, the grafting rate is very low and this results in a reduction in the impact resistance.

The process according to the invention avoids these disadvantages and permits the production, without having the disadvantages of the bulk or mass process, of products with good impact resistance and with good resistance to ageing, these products being at least as good as the products obtained by the bulk process described in French Pat. 1,385,548.

According to the present invention, the mixing of the halogenated butyl rubber with the vinyl chloride is effected prior to being brought into suspension and prior to the polymerisation of the vinyl chloride.

The chlorinated butyl rubber is brought into solution in vinyl chloride, the mixture is stirred until there is complete dissolution and total homogenisation thereof, after which the water and the usual ingredients of the polymerisation are introduced. The vinyl chloride is then polymerised in aqueous suspension in the presence of radical catalysts, surface-active agents, suspension agents and, if required, a buffering product. The polymerisation is generally carried out at pressures which are below 20 atomspheres and at temperatures which are between 20 and 80° C. The pressure is preferably between 4 and 14 atmospheres and the temperature is between 40 and 70° C., depending on the K-value which it is desired to obtain.

By using this process, high grafting rates are obtained, this being necessary to obtain products with high impact resistance, as will be subsequently shown by the examples giving the impact resistance of mechanical mixtures of polyvinyl chloride with chlorinated butyl rubber, of products obtained by suspension polymerisation without previous mixing and of products obtained by the process according to the invention.

In accordance with the process of the present invention, a solution of chlorinated butyl rubber in monomeric vinyl chloride is mixed while stirring, the said solution containing about 1 to 20% by weight of chlorinated butyl rubber to 99 to 80% of vinyl chloride, and preferably 2 to 10% of chlorinated butyl rubber to 98 to 90% of monomeric vinyl chloride.

According to one embodiment of the present invention, the chlorinated butyl rubber can have grafted thereon the vinyl chloride in admixture with other monomers which are adapted to vary the properties of the polyvinyl chloride, depending on the proposed use. These monomers must not exceed 20% by weight of the total mixture of monomers and can be selected from the following: vinylidene chloride, acrylates and methacrylates, vinyl acetate, dialkyl fumarates and alkyl vinyl ether. It is obvious that other suitable monomers can be used and the choice of the monomer depends on the quality which it is desired to obtain.

According to another embodiment of the present invention, the vinyl chloride can be polymerised by itself or in admixture with other monomers, in the presence of chlorinated butyl rubber mixed with a minor quantity of another polymer or copolymer. This second polymer must not exceed 20% by weight of the total mixture of the polymers present before the grafting and can be selected from the following: ethylene-vinyl acetate copolymers, ethylene-propylene copolymers, ethylene-propylene-diolefine terpolymers, etc.

After completely dissolving the polymer or polymers in the monomer or monomers, the water and the usual ingredients for the polymerisation are introduced, these being catalysts, suspension agents, surface-active agents and, if necessary, a buffering agent.

The catalysts are present in quantities which are preferably between 0.01% and 0.5% by weight of the total quantity of monomer, and they can be selected from the peroxides, peresters and the azo catalysts. As examples, the following catalysts may be mentioned: benzoyl peroxide, lauroyl peroxide, alkyl perpivalates and, in particular, t-butyl perpivalates, alkyl peroxydicarbonates, such as isobutyl and acetyl-cyclohexane-sulphonyl peroxydicarbonates, azonitriles and particularly azo-bis-isobutyronitrile and azo-bis-isovaleronitrile, or combinations of these catalysts with one another or with other catalysts of radical type.

Among all the catalysts, t-butyl cyclohexyl peroxydicarbonate, is preferred since it is helpful in producing a good yield.

The suspension agents are preferably introduced in proportions which are between 0.05 and 1% by weight of the total quantity of monomer and can be selected from cellulose derivatives and the partially hydrolysed polyacetates. As examples, there may be mentioned polyvinyl alcohol, methyl cellulose, hydroxypropyl cellulose and gelatine.

Useful surface-active agents include sulphonates or sulphosuccinates in proportions which are between 0.01 and 0.5% by weight of the total quantity of monomer.

After all these ingredients have been introduced, the temperature of the resulting mixture is raised and the polymerisation is carried out at the pressure and temperature corresponding to the desired K-value. The polimerization can possibly be carried out in two steps, the first step taking place at a polymerisation temperature lower than in the second step. It is also possible to effect polymerisation by causing the temperature to rise progressively, instead of keeping it at a definite or predetermined temperature.

In order to obtain a product characterized by suitable impact resistance, the quantity of chlorinated butyl rubber present in the final product is between 1 and 30% and preferably it is from 5 to 15%. Accordingly, a quantity of chlorinated butyl rubber is introduced into the initial mixture and the polymerisation is conducted in accordance with the quantity of chlorinated butyl rubber which it is desired to obtain in the final product.

Chlorinated butyl rubber is a non-toxic material, and the product obtained according to the invention can be used in numerous fields, particularly in the packaging of food products. It may in particular be mixed with polyvinyl chloride homopolymer or with copolymers of vinyl chloride having a high content of vinyl chloride, for improving the impact resistance of these products in rigid applications (for example, bottles).

The following examples are illustrative and are not to be considered as limiting the invention.

EXAMPLE 1

Into a 16-litre stainless steel reactor equipped with an agitator are introduced 60 g. of commercial chlorinated butyl rubber "Enjay Butyl HT 10–66," obtained by chlorination of butyl rubber (chlorine content 2.80% by weight), which is dissolved in 3 kg. of vinyl chloride for 4 hours at 25° C.

8 kg. of water, 30 g. of polyvinyl alcohol and 0.03 g. of alkyl sulphonate "TR 70" are then added. After introducing 11 g. of lauroyl peroxide, polymerisation is carried out at 64° C. for 3 hours.

After removing the unreacted vinyl chloride a modified polyvinyl chloride containing 3% of chlorinated butyl rubber is obtained in a 62% yield.

300 g. of the product obtained are mixed with 6 g. of lead tribasic sulphate "Sicostab D 15" and 4.5 g. of fatty acid esters "Loxiol GS" and then malaxated at 180° C. for 5 minutes. The sheets obtained are pressed at 190° C. for 8 minutes, in order to obtain a plate from which are cut standard rods (standard ISO/R 179–61).

The impact resistance is determined with a Charpy apparatus: the mean value on 10 test elements at 20° C. is 3.2 kg./cm./cm.$^2$, whereas a polyvinyl chloride homopolymer prepared under the same conditions has an impact resistance of 2.5 kg./cm./cm.$^2$.

The Vicat point (flow resistance under heat) is 78° C.

EXAMPLE 2

Example 1 is repeated, but using 300 g. of chlorinated butyl rubber instead of 60 g.

After 3 hours, the yield of polyvinyl chloride is 59% and the product obtained containeds 14.5% of chlorinated butyl rubber. The impact resistance of this product is 8.6 kg./cm./cm.$^2$.

The product obtained is extracted with different solvents (cyclohexane for the chlorinated butyl rubber and methyl ethyl ketone for the polyvinyl chloride homopolymer); the product is characterized by the following composition:

|  | Percent |
|---|---|
| Chlorinated butyl rubber homopolymer | 1 |
| Polyvinyl chloride homopolymer | 70 |
| Grafted copolymer | 29 |

EXAMPLE 3

Into the reactor of Example 1 are introduced 300 g. of chlorinated butyl rubber "Enjay Butyl HT 10–66," which is dissolved in 4 kg. of vinyl chloride for 6 hours at 25° C.

6.8 kg. of water, 20 g. of polyvinyl alcohol and 0.04 g. of alkyl sulphonate "TR 70" are then added.

After introducing 8 g. of lauroyl peroxide, polymerisation is carried out at 64° C. for 6½ hours.

After removing the unacted vinyl chloride, a modified polyvinyl chloride containing 10% of chlorinated butyl rubber is obtained with a yield of 67%.

300 g. of the product thus obtained are mixed with 6 g. of lead tribasic sulphate "Sicostab D 15" and with 4.5 g. of fatty acid esters "Loxiol GS," whereafter it is mallaxated at 180° C. for 5 minutes. The sheets obtained are pressed at 190° C. for 8 minutes, in order to obtain a plate from which are cut standard bars (standard ISO/R 179–61).

The impact resistance is determined with a Charpy apparatus: the mean value on 10 test elements at 20° C. is 5.9 kg. cm./cm.$^2$.

The Vicat point (flow resistance under heat) is 77° C.

EXAMPLES 4 to 8

Operating under the same conditions as in Example 3, the quantity of the chlorinated butyl rubber is varied. The quantities of initially added chlorinated butyl rubber, the percentage of chlorinated butyl rubber in the product obtained and the properties determined in the same manner as in Example 3 are set out in the following table:

| Polymer: | Quantity of added chlorinated butyl rubber, g. | Percentage of chlorinated butyl rubber in the product obtained | Charpy impact resistance at 20° C. in kg. cm./cm.$^2$ | Vicat point in ° C. |
|---|---|---|---|---|
| A | 0 | 0 | 2.5 | 77 |
| B | 110 | 4 | 3.2 | 80 |
| C | 200 | 7 | 4 | 78 |
| D | 300 | 10 | 5.9 | 77 |
| E | 400 | 13 | Unbroken | 75 |

It is noted that, the impact resistance increases with the quantity of chlorinated butyl rubber which is present in the resulting product.

As comparative tests, mechanical mixtures of chlorinated butyl rubber and polyvinyl chloride homopolymer were prepared and tested under the same conditions. The results are set out in the following table:

| Polymers: | Charpy impact resistance at 20° C. in kg. cm./cm.² | Vicat point in ° C. |
|---|---|---|
| A | 2.5 | 77 |
| A plus 4% of chlorinated butyl | 3 | 78 |
| A plus 7% of chlorinated butyl | 3.5 | 77 |
| A plus 10% of chlorinated butyl | 3.1 | 76 |
| A plus 13% of chlorinated butyl | 2.5 | 72 |

As already mentioned above, the products obtained by graft polymerisation have a decidedly higher impact resistance than simple mechanical mixtures.

The products obtained were extracted by means of selective solvents:

cyclohexane for the chlorinated butyl rubber,
methyl ethyl ketone for the polyvinyl chloride homopolymer.

The compositions of the products expressed as percentages are set out in the following table:

| Polymer: | Chlorinated butyl homopolymer | P.V.C. homopolymer | Grafted copolymer |
|---|---|---|---|
| B | 0.5 | 89 | 10.5 |
| C | 1 | 79 | 20 |
| D | 2 | 67 | 31 |
| E | 2 | 64 | 34 |

EXAMPLE 9

Into the reactor of Example 1 are introduced 200 g. of chlorinated butyl rubber, which is dissolved in 4 kg. of vinyl chloride for 6 hours at 25° C.

6.8 kg. of water, 20 g. of polyvinyl alcohol and 0.04 g. of alkyl sulphonate "TR 70" are then added.

After introducing 8 g. of lauroyl peroxide, polymerisation takes place at 52° C., there is obtained a product having a K-value of 70, whereas a product having a K-value of 61 was obtained by working at 64° C.

After 20 hours, the yield of polyvinyl chloride is 72% and the polymer contains 6.5% of chlorinated butyl rubber.

The impact resistance is equal to 8.3 kg. cm./cm.² and the Vicat point to 79° C.

After extraction with cyclohexane and with methyl ethyl ketone a product is obtained having the following composition:

| | Percent |
|---|---|
| Chlorinated butyl rubber homopolymer | 1 |
| Polyvinyl chloride homopolymer | 80 |
| Grafted copolymer | 19 |

Compared with polymer C of the preceding example, of which the rubber content is very similar, the polymer product of this example has a higher impact resistance because of its higher K-value.

EXAMPLE 10

Example 9 is repeated, except for the difference that 4 g. of t-butyl cyclohexyl peroxydicarbonate are introduced instead of 8 g. of lauroyl peroxide.

After 8 hours, the yield of polyvinyl chloride is 95% and the product obtained contains 5% of chlorinated butyl rubber.

The impact resistance is 10.2 kg. cm./cm.² and and Vicat point to 81° C.

After extraction with cyclohexane and methyl ethyl ketone the polymer product is characterized by the following composition:

| | Percent |
|---|---|
| Chlorinated butyl rubber homopolymer | 2 |
| Polyvinyl chloride | 61 |
| Grafted copolymer | 37 |

EXAMPLE 11

Example 10 is repeated, except for the difference that 2 g. instead of 4 g. of t-butyl cyclohexyl peroxydicarbonate are introduced.

The degree of conversion of the vinyl chloride is 66% after 17 hours of polymerisation and the polymer contains 7% of chlorinated butyl rubber.

The tests for impact resistance at 20° C. do not show any break on 10 tested elements and there is a Vicat point of 79° C.

After extraction with cyclohexane and with methyl ethyl ketone there is obtained a polymer having the following composition:

| | Percent |
|---|---|
| Chlorinated butyl rubber homopolymer | 1 |
| Polyvinyl chloride homopolymer | 54 |
| Grafted copolymer | 45 |

By comparison of Examples 9, 10 and 11, it is noted that, despite identical polymerisation temperatures (and thus the same K-value) and substantially equal contents of chlorinated butyl rubber, the products obtained with the t-butyl cyclohexyl peroxydicarbonate have impact resistance values which are clearly higher than those obtained with lauroyl peroxide, because the t-butyl cyclohexyl peroxy-dicarbonate favours the grafting to a much greater degree than the other catalysts.

EXAMPLE 12

Into the reactor of Example 1 are introduced 200 g. of chlorinated butyl rubber, which is dissolved in 4 kg. of vinyl chloride monomer for 14 hours at 20° C.

6.8 kg. of water, 20 g. of polyvinyl alcohol and 0.04 g. of alkyl sulphonate "TR 70" are then added.

After 3 g. of t-butyl cyclohexyl peroxydicarbonate have been introduced, polymerisation is effected at 52° C.

After polymerising for 7½ hours, the degree of conversion is 58%, that is to say, the modified product contains 8.5% by weight of chlorinated butyl rubber homopolymer or graft and 91.5% by weight of vinyl chloride in the form of a homopolymer or grafted copolymer.

The extraction with cyclohexane and methyl ethyl ketone gives a product having the following composition:

| | Percent |
|---|---|
| Chlorinated butyl rubber homopolymer | 1 |
| Polyvinyl chloride homopolymer | 73.5 |
| Grafted copolymer | 25.5 |

Of 91.5% of vinyl chloride, 18% are thus grafted on 7.5% of chlorinated butyl rubber.

The impact resistance of the product is equal to 11.6 kg. cm./cm.² and the Vicat point to 79° C.

The polymer has a homogeneous appearance and its behaviour under calendering is good.

As comparative tests the product of Example 12 was reproduced twice, but introducing the vinyl chloride into the aqueous suspension already containing the chlorinated butyl rubber.

In the first test, 200 g. of finely crushed chlorinated butyl rubber were introduced into 6.8 kg. of water containing 20 g. of polyvinyl alcohol, 0.04 g. of alkyl sulphonate and 3 g. of t-butyl cyclohexyl peroxydicarbonate, whereafter 4 kg. of vinyl chloride monomer were added and the polymerisation was effected at 52° C.

After a polymerisation time of 6½ hours, the degree of conversion is 63%, that is to say, the modified product contains 8% of chlorinated butyl rubber homopolymer or graft and 92% by weight of vinyl chloride in the form of homopolymer or grafted copolymer.

Extraction with cyclohexane and with methyl ethyl ketone gives a product having the following composition:

| | Percent |
|---|---|
| Chlorinated butyl rubber homopolymer | 2 |
| Polyvinyl chloride homopolymer | 90 |
| Grafted copolymer | 8 |

Of 92% of vinyl chloride, only 2% is grafted on 6% of chlorinated butyl rubber, and this is an extremely small amount.

In the second test, 200 g. of finely crushed chlorinated butyl rubber were introduced into 6.8 kg. of water, containing 20 g. of polyvinyl alcohol and 0.04 g. of alkyl sulphonate, whereafter 4 kg. of vinyl chloride monomer were added and finally 3 g. of t-butyl cyclohexyl peroxydicarbonate, after which polymerisation was effected at 52° C.

After a polymerisation time of 11 hours 40 minutes, the degree of conversion is 68%, that is to say, the modified product contains 7.5% of chlorinated butyl rubber as a homopolymer or graft and 92.5% of vinyl chloride in the form of homopolymer or grafted copolymer.

The extraction with cyclohexane and with methyl ethyl ketone gives a product having the following composition:

|  | Percent |
|---|---|
| Chlorinated butyl rubber homopolymer | 1.5 |
| Polyvinyl chloride homopolymer | 87.5 |
| Grafted copolymer | 11 |

Of 92.5% of vinyl chloride, only 5% are grafted on 6% of chlorinated butyl rubber, and this is low.

The two products obtained in these two tests had a heterogeneous appearance and they gave poor results on calendering, because they were friable.

The impact resistance of the first was 3.7 kg. cm./cm.$^2$ and its Vicat point product was 77° C.

The impact resistance of the second was 4.1 kg. cm./cm.$^2$ and its Vicat point 81° C.

These comparative tests thus clearly show that the process according to the invention gives results which are decidedly better than a conventional suspension process, as regards:

the degree of grafting,
the impact resistance,
the behaviour under calendering,
and the appearance.

We claim:

1. A process for the preparation of an impact-resistant modified polyvinyl chloride which comprises dissolving and homogenizing 99 to 80 parts by weight of vinyl chloride in 1 to 20 parts by weight of chlorinated butyl rubber followed by polymerizing the resulting mixture in an aqueous medium.

2. A process according to claim 1 wherein the polymerisation is conducted in the presence of between 0.01% and 0.5%, by weight of the total quantity of monomer, of t-butyl cyclohexyl peroxydicarbonate.

3. A process according to claim 1 wherein the polymerisation is conducted at temperatures between 20 and 80° C. and at pressures not exceeding atmospheric.

4. A process for the preparation of a modified polyvinyl chloride, according to claim 3, wherein the polymerization is conducted at a temperature between 30° and 70° C. and at pressures varying between 4 and 14 atmospheres.

References Cited

UNITED STATES PATENTS

| 3,281,345 | 10/1966 | Kuhne et al. | 204—163 |
| 3,387,062 | 6/1968 | Thomas et al. | 260—876 |

FOREIGN PATENTS

| 716,633 | 8/1965 | Canada. |

JOSEPH L. SCHOFER, Primary Examiner

R. A. GAITHER, Assistant Examiner